United States Patent
Ha et al.

(10) Patent No.: US 8,362,759 B2
(45) Date of Patent: Jan. 29, 2013

(54) METHOD TO PREDICT PHASE CURRENT

(75) Inventors: Jung Ik Ha, Seoul (KR); Jong Ho Kim, Suweon-si (KR); Ho Sun Yoo, Seongnam-si (KR); Hyung Sun You, Suwon-si (KR); Jang Hwan Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 569 days.

(21) Appl. No.: 12/588,095

(22) Filed: Oct. 2, 2009

(65) Prior Publication Data

US 2010/0148753 A1    Jun. 17, 2010

(30) Foreign Application Priority Data

Oct. 2, 2008    (KR) .................. 10-2008-0097420

(51) Int. Cl.
*G01R 13/14*        (2006.01)
(52) U.S. Cl. .................. 324/76.15; 324/76.11; 324/107; 318/801; 318/811; 318/729
(58) Field of Classification Search .............. 324/76.15; 318/400.35, 801
See application file for complete search history.

(56) References Cited

U.S. PATENT DOCUMENTS

| | | | |
|---|---|---|---|
| 6,914,409 B2 * | 7/2005 | Nukushina | 318/800 |
| 7,119,530 B2 * | 10/2006 | Mir et al. | 324/76.15 |
| 7,193,388 B1 * | 3/2007 | Skinner et al. | 318/811 |
| 7,804,266 B2 * | 9/2010 | Tomigashi | 318/599 |
| 7,834,574 B2 * | 11/2010 | West et al. | 318/496 |
| 7,893,650 B2 * | 2/2011 | Arnet | 318/811 |
| 8,040,086 B2 * | 10/2011 | Yamamoto | 318/400.02 |
| 8,050,543 B2 * | 11/2011 | Katyal et al. | 388/811 |
| 2005/0174076 A1 * | 8/2005 | Katanaya | 318/254 |

* cited by examiner

*Primary Examiner* — Richard Isla Rodas
(74) *Attorney, Agent, or Firm* — Staas & Halsey LLP

(57) ABSTRACT

A phase current prediction method is disclosed. The phase current prediction method predicts current representative of a PWM period using a motor model which receives current measured through a single current sensor as an input, instead of the measured current, and determines the predicted current to be phase current.

13 Claims, 13 Drawing Sheets

FIG. 3

| Fundamental voltage vector (Q1. Q3, Q5) | phase current (Iabc) |
|---|---|
| V1 (1.0.0) | Ia |
| V2 (1.1.0) | -Ic |
| V3 (0.1.0) | Ib |
| V4 (0.1.1) | -Ia |
| V5 (0.0.1) | Ic |
| V6 (1.0.1) | -Ib |
| V7 (1.1.1) | 0 |
| V8 (0.0.0) | 0 |

р
US 8,362,759 B2

METHOD TO PREDICT PHASE CURRENT

CROSS-REFERENCE TO RELATED APPLICATION

This application claims the benefit of Korean Patent Application No. 2008-0097420, filed on Oct. 2, 2008 in the Korean Intellectual Property Office, the disclosure of which is incorporated herein by reference.

BACKGROUND

1. Field

Embodiments of the present invention relate to a phase current prediction method to measure DC link current of an inverter through a single current sensor provided between the inverter, which drives a motor, and a DC voltage source to predict phase current of the motor.

2. Description of the Related Art

Generally, an inverter circuit is a power conversion device that converts direct current (DC) power into pulse-shaped 3-phase (U, V and W) alternating current (AC) power having a variable frequency. Due to reduction in energy consumption and easiness of output control, the inverter circuit has been increasingly used to drive motors used in electric products such as a washing machine, refrigerator, and air conditioner.

In order to properly control a motor using the inverter circuit, a method has been used which detects phase current applied to the motor and controls current to be applied to the motor based on the detected phase current in a pulse width modulation (PWM) scheme.

Recently, a method has been widely used which introduces a space vector concept to control a motor in a space vector pulse width modulation (SVPWM) scheme. This method controls current to be applied to the motor based on phase current detected by a single current sensor.

In the method that controls the motor in the SVPWM scheme, sampling-based average current is used, whereas current actually flowing to the motor continuously varies, and is not fixed, as shown in FIG. 1.

In an SVPWM scheme using three current sensors, carrier start or middle values $i_a^m$, $i_b^m$ and $i_c^m$, which are control representative values indicative of average current in a PWM period, are measured for control of a motor, the measured values are determined to be phase currents, and currents to be applied to the motor are controlled based on the determined phase currents.

However, in the SVPWM scheme using the single current sensor, current is measured in a switching period, not at the middle of a sampling period, resulting in occurrence of a current error.

As shown in FIG. 1, current measurements are made in effective voltage vector periods, and the resulting values exhibit differences with $i_a^m$, $i_b^m$ and $i_c^m$, which are representative values of those periods. For example, in the case where the angle of an output voltage is present between 0 and π/3, current $i_a^s$ and current $i_c^s$ are measured respectively at Ta and Tc in a scheme that measures current flowing to a DC link. In this case, there are current errors $\Delta i_a^m$ and $\Delta i_c^m$ between $i_a^s$ and $i_c^s$ and $i_a^m$ and $i_c^m$ as in the following equations 1 and 2.

$$\Delta i_a^m = i_a^s - i_a^m \quad \text{[Equation 1]}$$

$$\Delta i_c^m = i_c^s - i_c^m \quad \text{[Equation 2]}$$

These current errors continuously vary with the operation state of the motor, resulting in occurrence of a current ripple. This current ripple causes noise in the motor and system, thus degrading a product quality.

SUMMARY

Therefore, it is an aspect of the present invention to provide a phase current prediction method to predict current representative of a PWM period using DC link current measured through a single current sensor and determine the predicted current to be phase current, thereby reducing a current error and, thus, a current ripple.

Additional aspects and/or advantages will be set forth in part in the description which follows and, in part, will be apparent from the description, or may be learned by practice of the invention.

The foregoing and/or other aspects of the present invention may be achieved by providing a phase current prediction method including sequentially applying an effective voltage vector to an inverter, measuring DC link current in a period in which the effective voltage vector is applied, and predicting three phase currents representative of a PWM period of the inverter using the measured DC link current.

The foregoing and/or other aspects of the present invention may be achieved by providing a phase current prediction method including sequentially applying a first effective voltage vector and a second effective voltage vector to an inverter, measuring first DC link current during a period in which the first effective voltage vector is applied, measuring second DC link current during a period in which the second effective voltage vector is applied, predicting phase current using the first DC link current before the measuring the second DC link current, and predicting three phase currents using the measured second DC link current and the predicted phase current after the measuring the second DC link current, and predicting the three phase currents for a PWM period using the predicted three phase currents.

BRIEF DESCRIPTION OF THE DRAWINGS

These and/or other aspects of the invention will become apparent and more readily appreciated from the following description of the embodiments, taken in conjunction with the accompanying drawings of which:

FIG. 3 is a table illustrating fundamental voltage vectors and corresponding phase currents predictable using a single current sensor, in a phase current prediction apparatus according to an embodiment of the present invention;

DETAILED DESCRIPTION OF EMBODIMENTS

Figure 1:
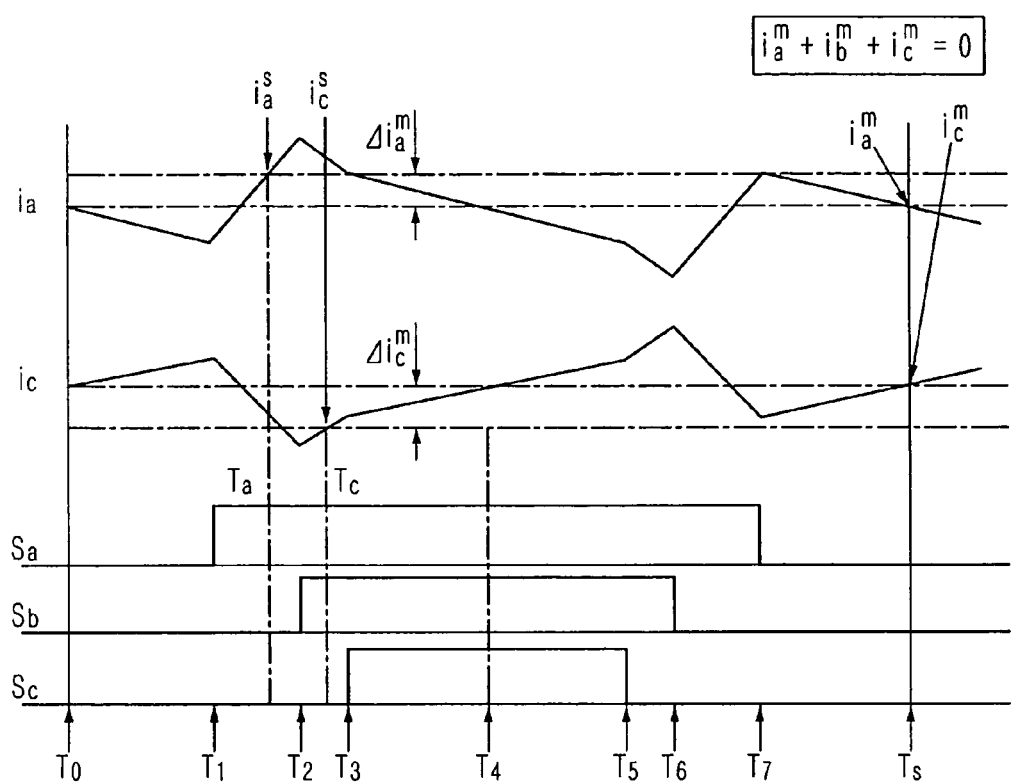
FIG. 1 is a waveform diagram of phase currents in a general PWM period.

Reference will now be made in detail to the embodiments, examples of which are illustrated in the accompanying drawings, wherein like reference numerals refer to the like elements throughout. The embodiments are described below to explain the present invention by referring to the figures.

Figure 2:
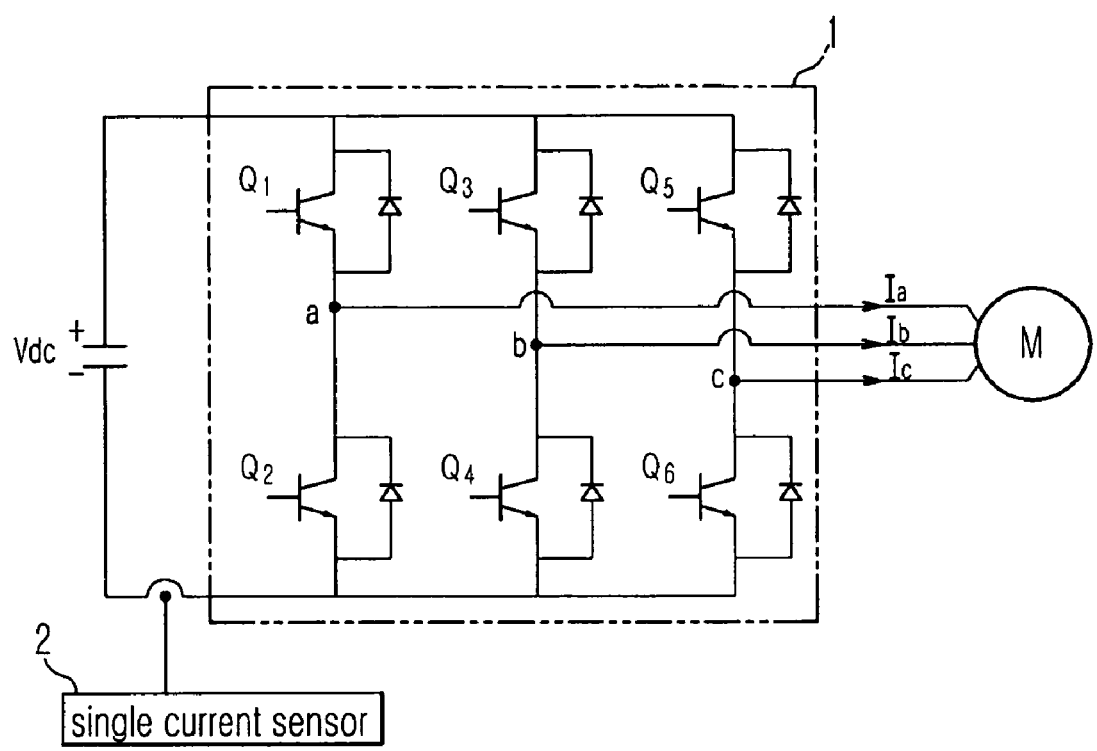
FIG. 2 is a circuit diagram schematically showing the configuration of a motor drive system to which a phase current prediction apparatus according to an embodiment of the present invention is applied.

FIG. 2 shows the configuration of a 3-phase PWM inverter system using a single current sensor, to which an embodiment of the present invention is applied.

As shown in FIG. 2, a 3-phase motor M, which is an AC motor, includes a stator including resistors and inductors, and an internal rotor. The 3-phase motor M has phase terminals connected to an inverter 1. When phase currents flow to the inductors respectively through the phase terminals, a magnetic field is formed, so as to rotate the internal rotor.

The inverter 1 functions to convert a DC voltage into a pulse-shaped 3-phase AC voltage having a variable frequency through pulse width modulation (PWM) to drive the motor. To this end, the inverter 1 has six switching elements Q1 to Q6 for switching, which are paired in series and connected respectively to the phase terminals of the 3-phase motor M. The upper switching elements Q1, Q3 and Q5 are connected to a positive terminal of a DC voltage source Vdc and the lower switching elements Q2, Q4 and Q6 are connected to a negative terminal of the DC voltage source Vdc. This inverter 1 is driven by an SVPWM signal pattern.

The single current sensor, denoted by reference numeral 2, is provided between the inverter 1 and the DC voltage source Vdc to measure current flowing to a DC link side of the inverter 1.

The operation of the 3-phase PWM inverter system with the above-stated configuration will hereinafter be described. The six switching elements Q1 to Q6 of the inverter 1 are on/off-controlled in such a manner that any one of the upper switching elements Q1, Q3 and Q5 is turned on and any one of the lower switching elements Q2, Q4 and Q6 corresponding to a phase different from a phase corresponding to the turned-on upper switching element is turned on. Also, while the switching elements Q1 to Q6 of the inverter 1 are switched, phase current of the motor M is predicted based on DC link current measured by the single current sensor 2 and the switching elements Q1 to Q6 of the inverter 1 are selectively switched based on the predicted phase current.

The switching elements Q1 to Q6 of the inverter 1 are controlled in pairs in such a manner that, when any one switching element of each pair is turned on, the other switching element is turned off. The upper switching elements Q1, Q3 and Q5 each have a 1 or 0 state to indicate the entire switching state of the inverter 1. Here, the 1 state means that a switch is closed to conduct, and the 0 state means that a switch is open. When the inverter 1 is controlled in this manner, it assumes any one of eight states corresponding to on/off combinations of the switching elements Q1 to Q6. An SVPWM scheme is a scheme that generates SVPWM signals using eight fundamental voltage vectors corresponding respectively to the eight states.

Also, DC link current detected by the single current sensor 2 in a period in which each fundamental voltage vector is applied corresponds to any one of three phase currents flowing to the motor M.

FIG. 3 is a table illustrating fundamental voltage vectors and corresponding phase currents predictable using a single current sensor, in an embodiment of the present invention.

As shown in FIG. 3, the fundamental voltage vectors include six effective voltage vectors V1 to V6, and two zero voltage vectors V7 and V8, which are, respectively, (1, 1, 1) and (0, 0, 0) indicating a state where no current flows to the motor M because all the upper or lower switching elements are turned off. Here, the numerals in parentheses indicate on/off states of the switching elements Q1, Q3 and Q5, respectively. The six effective voltage vectors V1 to V6, among the fundamental voltage vectors, are arranged to be 60 degrees out of phase with each other, and the zero voltage vectors V7 and V8 are positioned at the origin of the effective voltage vectors V1 to V6. When a command voltage vector required for control of the motor is given, SVPWM signals are generated such that fundamental voltage vectors V1 to V8 into which the command voltage vector is decomposed are applied.

Figure 4:
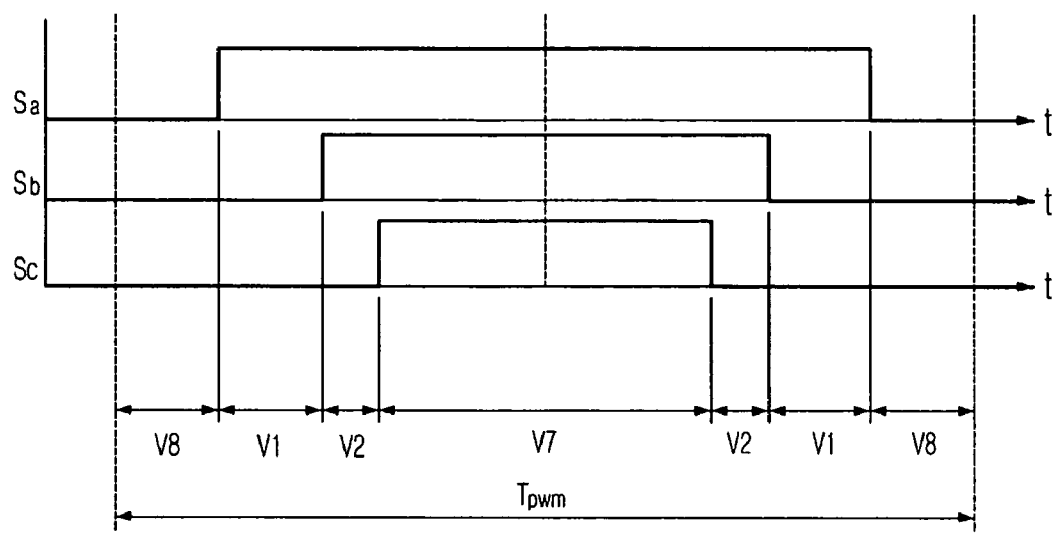
FIG. 4 is a view illustrating SVPWM signals and application times of respective fundamental voltage vectors based on the SVPWM signals, in a phase current prediction apparatus according to an embodiment of the present invention.

As shown in FIG. 4, SVPWM signals are generated for control of the operation of the inverter based on a command voltage vector in a PWM period Tpwm. For example, Sa, Sb and Sc may be SVPWM signals for control of the switching elements Q1, Q3 and Q5, respectively. When this modulation is performed, the fundamental voltage vectors are applied to the motor M in the order of V8, V1, V2, V7, V2, V1 and V8. An application time of each fundamental voltage vector is shown in FIG. 4. As a result, DC link current may be measured through the single current sensor 2 in a period in which each effective voltage vector, among the fundamental voltage vectors, is applied, currents of two different phases may be predicted from the measured DC link current, and current of the remaining one phase may then be predicted using the fact that the sum of three phase currents is 0.

Figure 5:
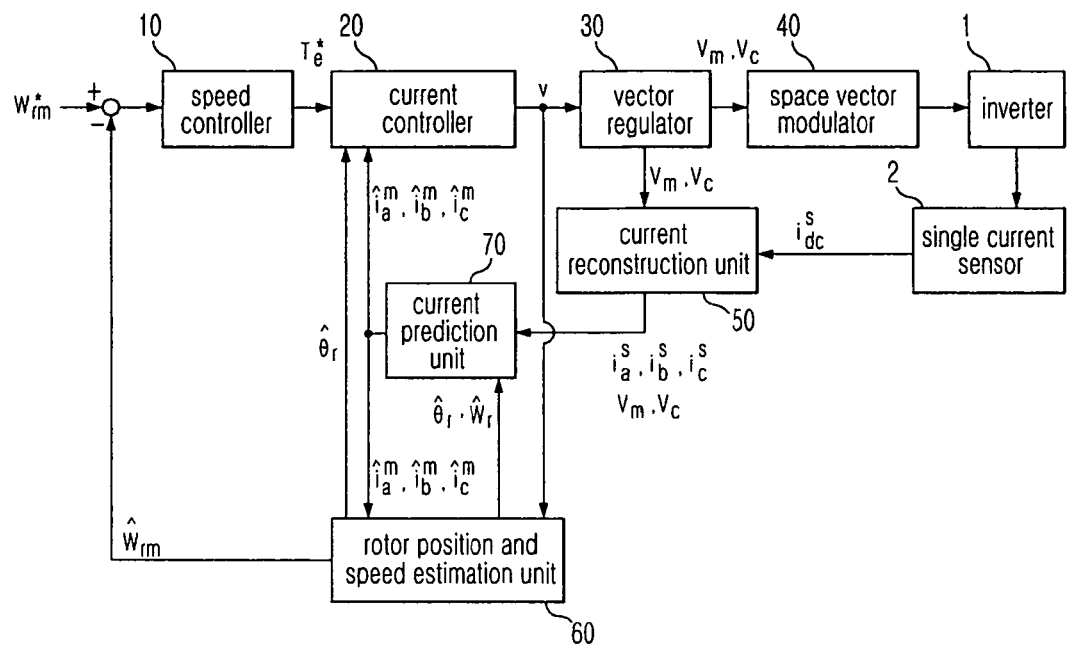
FIG. 5 is a block diagram of a motor drive system to which a phase current prediction apparatus according to an embodiment of the present invention is applied.

FIG. 5 shows the configuration of a motor drive system to which a phase current prediction apparatus according to an embodiment of the present invention is applied.

As shown in FIG. 5, the motor drive system includes a speed controller 10, current controller 20, vector regulator 30, space vector modulator 40, current reconstruction unit 50, current prediction unit 70, and rotor position and speed estimation unit 60, in addition to the inverter 1 and single current sensor 2.

The speed controller 10 receives a speed command and an estimated speed and outputs a torque command.

The current controller 20 receives the torque command and three phase currents predicted by the current prediction unit 70 and applies a reference voltage vector v based on the received torque command and three phase currents to the vector regulator 30.

The vector regulator 30 performs no modulation and compensation for the reference voltage vector v when the reference voltage vector v is present in an effective area of a space vector domain. When the reference voltage vector v is present in an ineffective area of the space vector domain, the vector regulator 30 performs modulation and compensation for the reference voltage vector v to deviate the reference voltage vector v from the ineffective area to the effective area and outputs the resulting modulated and compensated voltage vectors vm and vc to the space vector modulator 40.

The space vector modulator 40 receives the reference voltage vector regulated by the vector regulator 30 and applies a phase voltage corresponding to a switching pattern to switch of the respective switching elements of the inverter 1 to the inverter 1. The inverter 1 on/off-controls the respective switching elements in response to the phase voltage corresponding to the switching pattern to apply three phase currents to the motor M.

The current reconstruction unit 50 reconstructs phase current using DC link current measured by the single current sensor 2 installed at the DC link side of the inverter 1 and the switching pattern for the respective switching elements of the inverter 1. The current reconstruction unit 50 provides the reconstructed phase current and the modulated and compensated voltage vectors vm and vc provided by the vector regulator 30 to the current prediction unit 70.

The rotor position and speed estimation unit 60 estimates the position and speed of the rotor of the motor M based on three phase currents predicted by the current prediction unit 70. The rotor position and speed estimation unit 60 provides the estimated rotor position and speed to the current prediction unit 70.

The current prediction unit 70 predicts three phase currents based on the reconstructed phase current and the modulated and compensated voltage vectors vm and vc from the current reconstruction unit 50 and the estimated rotor position and speed from the rotor position and speed estimation unit 60. The predicted three phase currents are provided to the current controller 20 for current control of the motor M or to the rotor position and speed estimation unit 60 for control of the position and speed of the rotor of the motor M.

The current prediction unit 70 predicts each phase current from a voltage, current, estimated flux angle and estimated speed as in the following equation 3.

$$\hat{i}_{abc}{}^m = f(i_{abc}{}^s, v_m, v_c, \hat{\theta}_r, \hat{\omega}_r) \quad \text{[Equation 3]}$$

This prediction aims at making the predicted current be a representative value of one PWM period as in the following equation 4.

$$\hat{i}_{abc}{}^m \rightarrow i_{abc}{}^m \quad \text{[Equation 4]}$$

The predicted current may be applied to a sensorless control, as shown in FIG. 5. The predicted three phase currents are utilized for the current control of the motor M or the rotor position and speed estimation.

Hereinafter, for the convenience of description, it is assumed that the motor M is a surface mounted permanent magnet motor.

For a surface mounted permanent magnet motor (SMPMM), the current prediction may be performed in the following manner. An equation for a terminal voltage of the SMPMM may be given as follows.

$$\begin{bmatrix} v_d^r \\ v_q^r \end{bmatrix} = \begin{bmatrix} R_s + pL_s & -\omega_r L_s \\ \omega_r L_s & R_s + pL_s \end{bmatrix} \begin{bmatrix} i_d^r \\ i_q^r \end{bmatrix} + \begin{bmatrix} 0 \\ \omega_r K_e \end{bmatrix} \quad \text{[Equation 5]}$$

where $v_d^r$ is a d-axis voltage on a rotor coordinate system, $v_q^r$ is a q-axis voltage on the rotor coordinate system, $i_d^r$ is d-axis current on the rotor coordinate system, $i_q^r$ is q-axis current on the rotor coordinate system, $\omega_r$ is an angular velocity, $R_s$ is a stator winding resistance, $L_s$ is a stator inductance, $K_e$ is a motor counter electromotive force constant, and p=d/dt.

A voltage vector of a rotating coordinate system may be expressed as follows.

$$v^r = R_s i^r + p\lambda^r + \omega_r J \lambda^r \quad \text{[Equation 6]}$$

where $$v^r = \begin{bmatrix} v_d^r \\ v_q^r \end{bmatrix}, i^r = \begin{bmatrix} i_d^r \\ i_q^r \end{bmatrix}, \lambda^r = \begin{bmatrix} L_s i_d^r + K_e \\ L_s i_q^r \end{bmatrix}, \text{ and}$$

$$J = \begin{bmatrix} 0 & -1 \\ 1 & 0 \end{bmatrix}.$$

The above equation 6 may be expressed in the form of a state equation as follows.

$$\dot{i}^r = A_r i^r + B_{r0} v^r + B_{r1} \quad \text{[Equation 7]}$$

where $$A_r = \frac{1}{L_s} \begin{bmatrix} -R_s & \omega_r L_s \\ -\omega_r L_s & -R_s \end{bmatrix}, B_{r0} = \frac{1}{L_s} I,$$

$$B_{r1} = \frac{1}{L_s} \begin{bmatrix} 0 \\ -\omega_r K_e \end{bmatrix}, I = \begin{bmatrix} 1 & 0 \\ 0 & 1 \end{bmatrix}.$$

In the present embodiment, the current prediction is performed in a period shorter than a switching period. In contrast, a mechanical operation characteristic is much slower than an electrical operation characteristic. Accordingly, the rotor speed and position in the prediction period are subject to little variation, so that they are regarded as constants. On this assumption, an asymptotic state predictor i may be expressed as follows.

$$\dot{\hat{i}}^r = (A_r - L_r)\hat{i}^r + L i^r + B_{r0} v^r + B_{r1} \quad \text{[Equation 8]}$$

where $L_r$ is a gain matrix for prediction.

A voltage vector of a coordinate system at rest may be expressed as follows.

$$v^s = T(-\theta_r)v^r = R_s i^s + p\lambda^s \quad \text{[Equation 9]}$$

where $$v^s = \begin{bmatrix} v_d^s \\ v_q^s \end{bmatrix}, i^s = \begin{bmatrix} i_d^s \\ i_q^s \end{bmatrix}, T(\theta_r) = \begin{bmatrix} \cos\theta_r & \sin\theta_r \\ -\sin\theta_r & \cos\theta_r \end{bmatrix}, \text{ and}$$

$$\lambda^s = L_s i^s + T(-\theta_r)\begin{bmatrix} K_e \\ 0 \end{bmatrix}.$$

Re-expressing the above equation 9, the result is:

$$v^s = R_s i^s + L_s p i^s + e^s \quad \text{[Equation 10]}$$

where $$e^s = \omega_r K_e \begin{bmatrix} -\sin\theta_r \\ \cos\theta_r \end{bmatrix}.$$

Applying the same assumption to the equation 8, the above equation 10 may be expressed as follows.

$$\dot{i}^s = A i^s + B_0 v^s + B_1 \quad \text{[Equation 11]}$$

where $$A = -\frac{R_s}{L_s}I,\ B_0 = \frac{1}{L_s}I,\ \text{and}\ B_1 = \frac{\omega_r K_e}{L_s}\begin{bmatrix} \sin\theta_r \\ -\cos\theta_r \end{bmatrix}.$$

An asymptotic state predictor of the coordinate system at rest may be expressed as follows.

$$\dot{\hat{i}}^s = (A_s - L_s)\hat{i}^s + L_s i^s + B_0 v^s + B_1 \qquad \text{[Equation 12]}$$

When both d-axis current and q-axis current are known, namely, when two phase currents are known, three phase currents are predicted using the equation 12.

However, in an SVPWM scheme using a single current sensor, only one phase current is measurable at one time.

A phase current-based predictor is introduced in order to solve this problem. A phase current model may be expressed from the equation 11 as follows.

$$\dot{i}_{abc} = A' i_{abc} + B'_0 v_{abc} + B'_1 \qquad \text{[Equation 13]}$$

where $$A' = -\frac{R_s}{L_s}I',\ B'_0 = \frac{1}{L_s}I',$$

$$i^s = \frac{1}{3}\begin{bmatrix} 2 & -1 & -1 \\ 0 & \sqrt{3} & -\sqrt{3} \end{bmatrix} i_{abc},$$

$$v^s = \frac{1}{3}\begin{bmatrix} 2 & -1 & -1 \\ 0 & \sqrt{3} & -\sqrt{3} \end{bmatrix} v_{abc},$$

$$B'_1 = \frac{\omega_r K_e}{L_s}\begin{bmatrix} \sin\theta_r \\ \sin(\theta_r + 2\pi/3) \\ \sin(\theta_r - 2\pi/3) \end{bmatrix},\ \text{and}$$

$$I' = \begin{bmatrix} 1 & 0 & 0 \\ 0 & 1 & 0 \\ 0 & 0 & 1 \end{bmatrix}.$$

A predictor in the phase current model may be implemented as follows.

$$\dot{\hat{i}}_{abc} = (A' - L')\hat{i}_{abc} + L' i_{abc} + B'_0 v_{abc} + B'_1 \qquad \text{[Equation 14]}$$

In order to decouple a state vector component from the predictor, a gain matrix of the predictor may be set as follows.

$$L' = \begin{bmatrix} L_a & 0 & 0 \\ 0 & L_b & 0 \\ 0 & 0 & L_c \end{bmatrix} \qquad \text{[Equation 15]}$$

where $L_a$, $L_b$ and $L_c$ are constants.

As a result, the equation 12 may be expressed as follows.

$$\dot{\hat{i}}_a = \left(-\frac{R_s}{L_s} - L_a\right)\hat{i}_a + L_a i_a + \frac{1}{L_s}v_a + \frac{\omega_r L_e}{L_s}\sin\theta_r \qquad \text{[Equation 16]}$$

$$\dot{\hat{i}}_b = \left(-\frac{R_s}{L_s} - L_b\right)\hat{i}_b + L_b i_b + \frac{1}{L_s}v_b + \frac{\omega_r L_e}{L_s}\sin\left(\theta_r + \frac{2\pi}{3}\right) \qquad \text{[Equation 17]}$$

$$\dot{\hat{i}}_c = \left(-\frac{R_s}{L_s} - L_c\right)\hat{i}_c + L_c i_c + \frac{1}{L_s}v_c + \frac{\omega_r L_e}{L_s}\sin\left(\theta_r - \frac{2\pi}{3}\right) \qquad \text{[Equation 18]}$$

Therefore, in the present embodiment, in the case where only one phase current is measurable through the single current sensor, it is predicted using any one of the equation 16, equation 17 or equation 18 corresponding thereto. Also, in the case where two phase currents are known, three phase currents are predicted using the equation 12.

Figure 6:
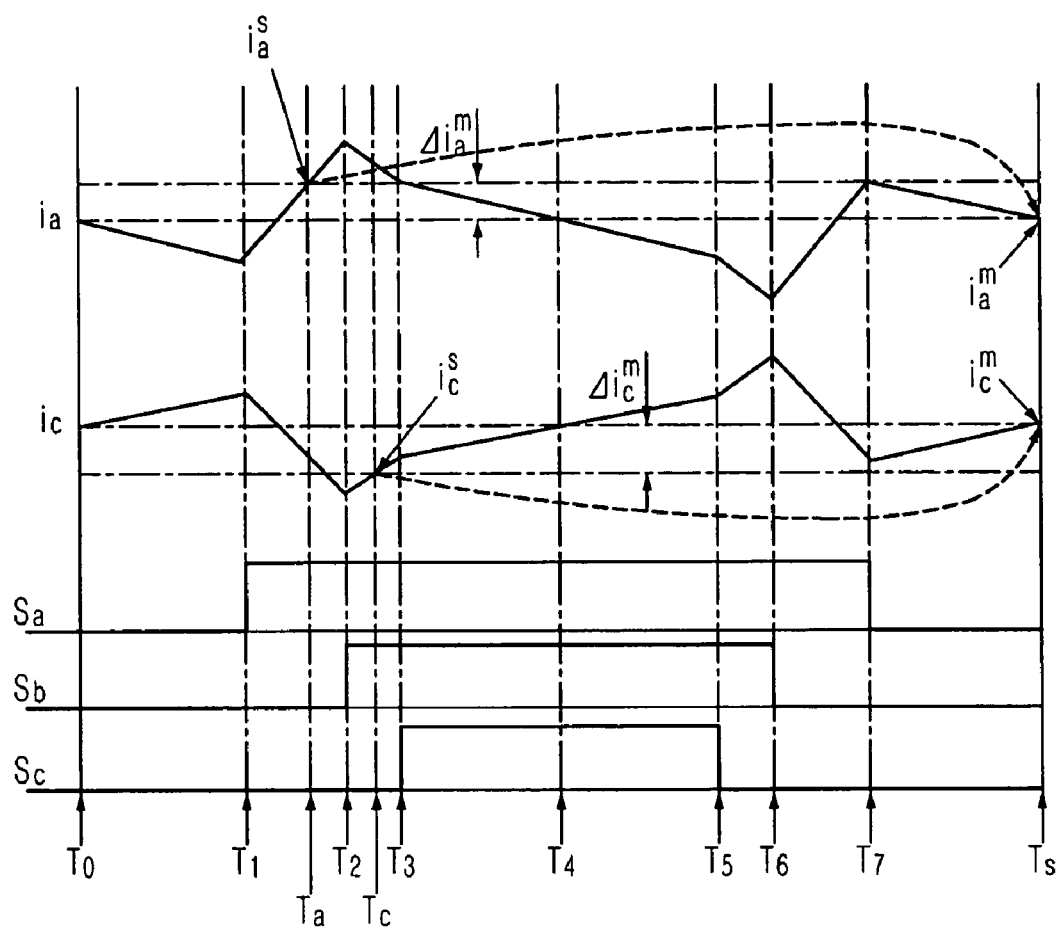
FIG. 6 is a waveform diagram illustrating a phase current prediction concept of a phase current prediction apparatus according to an embodiment of the present invention.

FIG. 6 illustrates a phase current prediction concept of a phase current prediction apparatus according to an embodiment of the present invention.

As shown in FIG. 6, in the SVPWM scheme using the single current sensor 2, because the switching state includes a plurality of operations, phase current is predicted separately at the plurality of operations. For example, when an output voltage is present in a sector 1 (1, 0, 0) among eight sectors V1 to V8, phase current is sampled at Ta and Tc, whereas current representative of one PWM period is sampled at Ts. In this regard, in the present embodiment, values measured at Ta and Tc are predicted to approximate values to be measured at Ts as much as possible, so that a current error may be reduced to improve performance of the motor.

Figure 7:
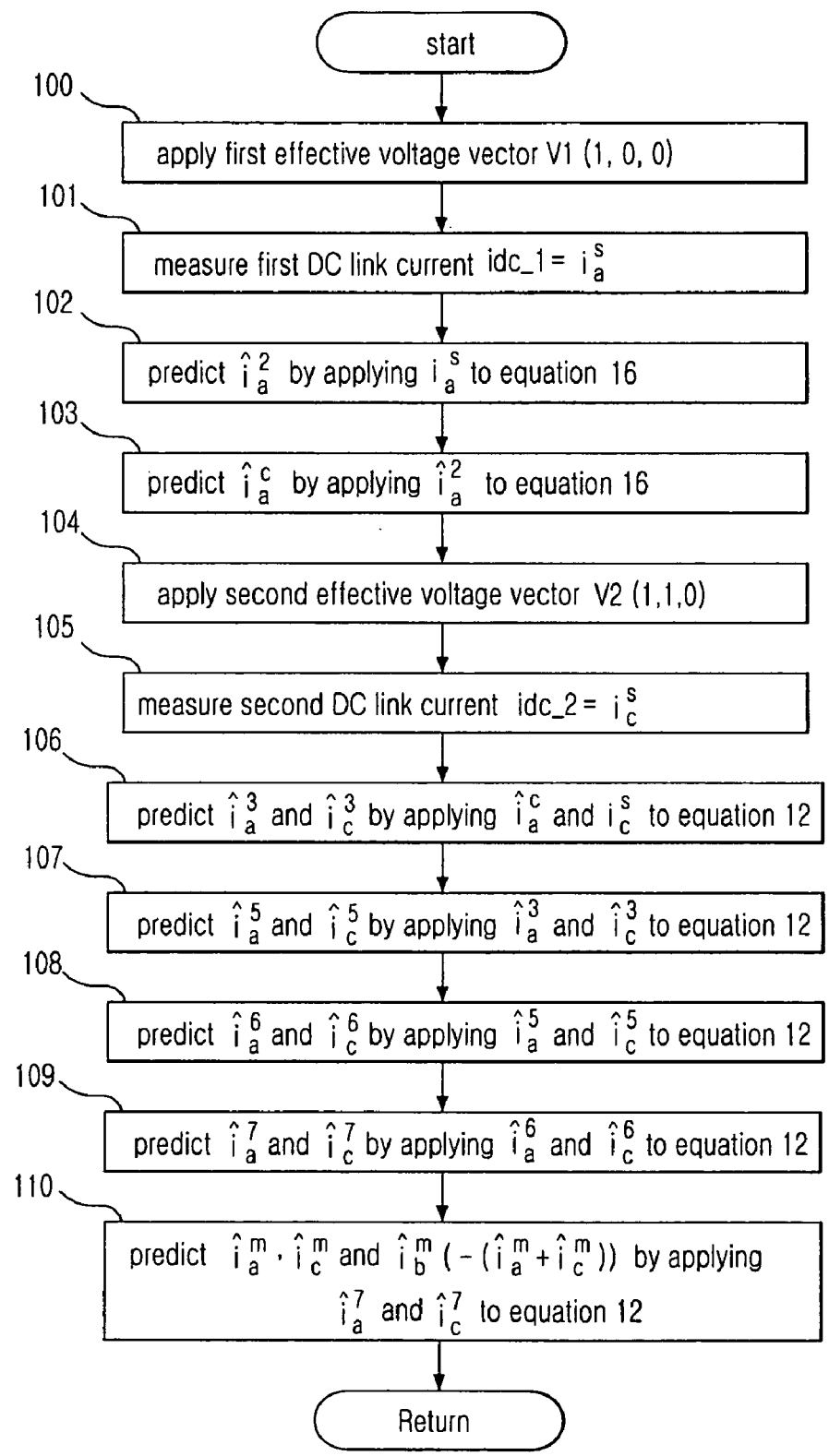
FIG. 7 is a flowchart illustrating a phase current prediction method according to one embodiment of the present invention.
Figure 8:
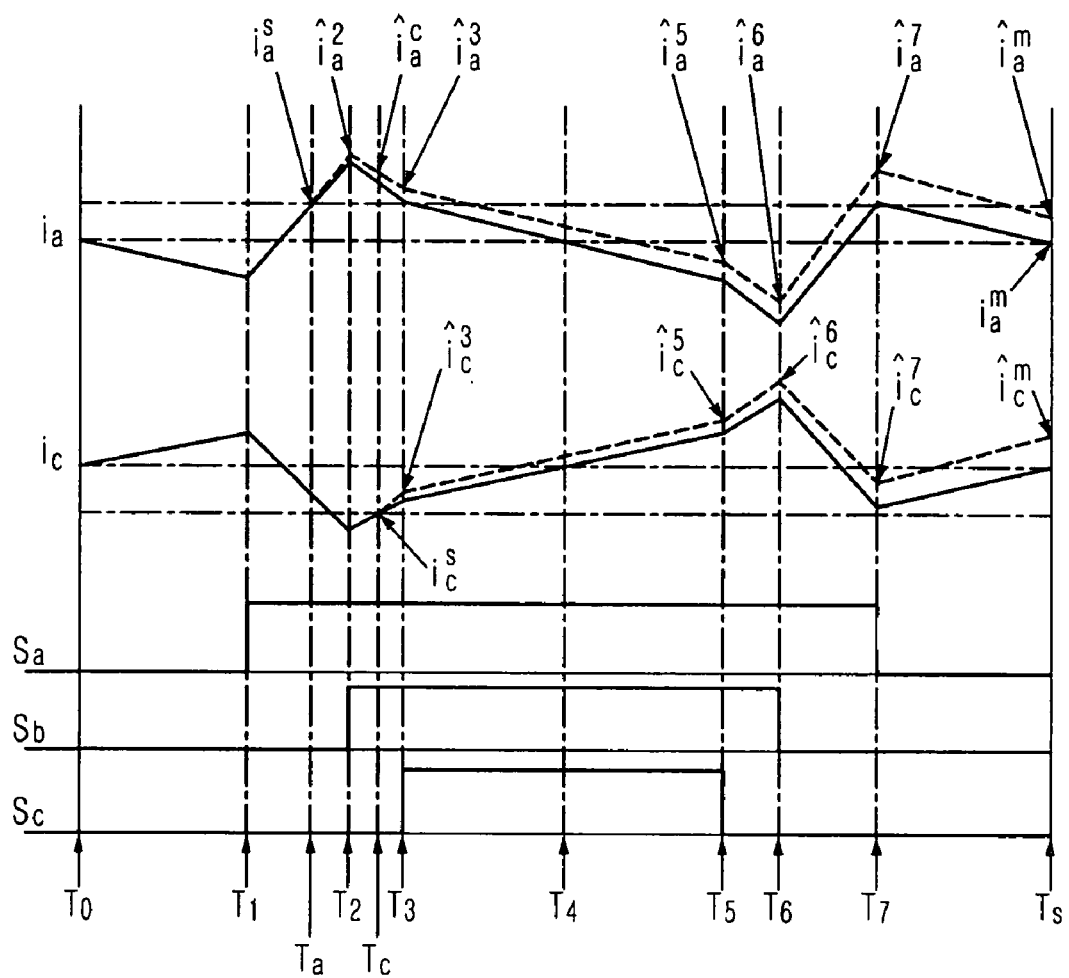
FIG. 8 is a waveform diagram illustrating prediction of three phase currents based on the method of FIG. 7.

FIG. 7 illustrates a phase current prediction method according to one embodiment of the present invention, and FIG. 8 illustrates prediction of three phase currents according to this embodiment.

Referring to FIGS. 7 and 8, in the case where an output voltage is present in a sector 1 and prediction operations are set in the order of time, the prediction starts with Ta and then proceeds to Ts via T2, Tc, T3, T4, T5, T6 and T7.

First, a first effective voltage vector V1 (1, 0, 0) is applied to the inverter 1 (100), and the output value of the single current sensor 2 is then read for measurement of a first DC link current Idc_1 (101). At this time, the first DC link current idc_1 is phase current $i_a^s$ of phase A.

After the first DC link current idc_1 is measured, phase current $\hat{i}_a^2$ is predicted (102). At this time, the phase current $\hat{i}_a^2$ may be obtained by applying the first DC link current $i_a^s$ to equation 16 and then integrating equation 16.

After the phase current $\hat{i}_a^2$ is predicted, phase current $\hat{i}_a^c$ is predicted (103). At this time, the phase current $\hat{i}_a^c$ may be obtained by applying the phase current $\hat{i}_a^2$ to equation 16 and then integrating equation 16.

Thereafter, a second effective voltage vector V2 (1, 1, 0) is applied to the inverter 1 (104), and the output value of the single current sensor 2 is then read for measurement of a second DC link current idc_2 (105). At this time, the second DC link current idc_2 is phase current $i_c^s$ of phase C.

After the second DC link current idc_2 is measured, phase currents $\hat{i}_a^3$ and $\hat{i}_c^3$ are predicted (106). At this time, the phase currents $\hat{i}_a^3$ and $\hat{i}_c^3$ may be obtained by applying the above-predicted $\hat{i}_a^c$ and the second DC link current $i_c^s$ to equation 12 and then integrating equation 12.

After the phase currents $\hat{i}_a^3$ and $\hat{i}_c^3$ are predicted, phase currents $\hat{i}_a^5$ and $\hat{i}_c^5$ are predicted (107). At this time, the phase currents $\hat{i}_a^5$ and $\hat{i}_c^5$ may be obtained by applying the phase currents $\hat{i}_a^3$ and $\hat{i}_c^3$ to equation 12 and then integrating equation 12.

After the phase currents $\hat{i}_a^5$ and $\hat{i}_c^5$ are predicted, phase currents $\hat{i}_a^6$ and $\hat{i}_c^6$ are predicted (108). At this time, the phase currents $\hat{i}_a^6$ and $\hat{i}_c^6$ may be obtained by applying the phase currents $\hat{i}_a^5$ and $\hat{i}_c^5$ to equation 12 and then integrating equation 12.

After the phase currents $\hat{i}_a^6$ and $\hat{i}_c^6$ are predicted, phase currents $\hat{i}_a^7$ and $\hat{i}_c^7$ are predicted (109). At this time, the phase currents $\hat{i}_a^7$ and $\hat{i}_c^7$ may be obtained by applying the phase currents $\hat{i}_a^6$ and $\hat{i}_c^6$ to equation 12 and then integrating equation 12.

After the phase currents $\hat{i}_a^7$ and $\hat{i}_c^7$ are predicted, three phase currents $\hat{i}_a^m$, $\hat{i}_c^m$, and $\hat{i}_b^m$ representative of a PWM period are finally predicted (110). At this time, the phase currents $\hat{i}_a^m$ and $\hat{i}_c^m$ may be obtained by applying the phase currents $\hat{i}_a^7$ and $\hat{i}_c^7$ to equation 12 and then integrating equation 12, and the phase current $\hat{i}_b^m$ may be obtained using a relationship ($\hat{i}_b^m=-(\hat{i}_a^m+\hat{i}_c^m)$) with the phase currents $\hat{i}_a^m$ and $\hat{i}_c^m$. As stated above, the three phase currents $\hat{i}_a^m$, $\hat{i}_c^m$, and $\hat{i}_b^m$ representative of the PWM period may be predicted using the DC link currents $\hat{i}_a^s$ and $i_c^s$ measured respectively in the effective voltage vector periods, thereby making it possible to reduce a current error and, thus, a current ripple.

To sum up, the above-described current prediction is advanced by switching operations as shown in FIG. 8, and the respective prediction operations are as follows.

OPERATION 1 (Ta to T2): predict $\hat{i}_a^2$ from equation 16, $\hat{i}_a=i_a^s$, and $v_a=2/3 \cdot V_{dc}$.

OPERATION 2 (T2 to Tc): predict $\hat{i}_a^c$ from equation 16 and $v_a=1/3 \cdot V_{dc}$.

OPERATION 3 (Tc to T3): predict $\hat{i}_a^3$ and $\hat{i}_c^3$ from equation 12, $\hat{i}_c=i_c^s$, $v_d=1/3 \cdot V_{dc}$, and $v_q=1/\sqrt{3} \cdot V_{dc}$.

OPERATION 4 (T3 to T5): predict $\hat{i}_a^5$ and $\hat{i}_c^5$ from equation 12, $v_d=0$, and $v_q=0$.

OPERATION 5 (T5 to T6): predict $\hat{i}_a^6$ and $\hat{i}_c^6$ from equation 12, $v_d=1/3 \cdot V_{dc}$, and $v_q=1/\sqrt{3} \cdot V_{dc}$.

OPERATION 6 (T6 to T7): predict $\hat{i}_a^7$ and $\hat{i}_c^7$ from equation 12, $v_d=2/3 \cdot V_{dc}$, and $v_q=0$.

OPERATION 7 (T7 to Tm): predict $\hat{i}_b^m=-(\hat{i}_a^m+\hat{i}_c^m)$, $\hat{i}_a^m$ and $\hat{i}_c^m$ from equation 12, $v_d=0$, and $v_q=0$.

At OPERATION 1 and OPERATION 2, any one phase current may be predicted. For example, phase current of phase A is predicted using the equation 16. This prediction is carried out in the Ta to Tc period of FIG. 8. At other OPERATIONS, three phase currents are predicted by obtaining two phase currents, converting the obtained two phase currents into d-axis current and q-axis current, respectively, and applying the converted d-axis current and q-axis current to equation 12. This prediction is carried out in the Tc to Ts period of FIG. 8. As stated above, with OPERATION 1 to OPERATION 7 sequentially performed, the three phase currents $\hat{i}_a^m$, $\hat{i}_b^m$ and $\hat{i}_c^m$ representative of the PWM period are predicted from the DC link currents $\hat{i}_a^s$ and $\hat{i}_c^s$ measured by the single current sensor 2. The predicted three phase currents $\hat{i}_a^m$, $\hat{i}_b^m$ and $\hat{i}_c^m$ are utilized for motor current control or motor rotor position and speed control.

Even in the case where effective voltage vectors are present in a different sector, the three phase currents $\hat{i}_a^m$, $\hat{i}_b^m$ and $\hat{i}_c^m$ may be predicted in a similar method to the above-stated method.

Figure 9:
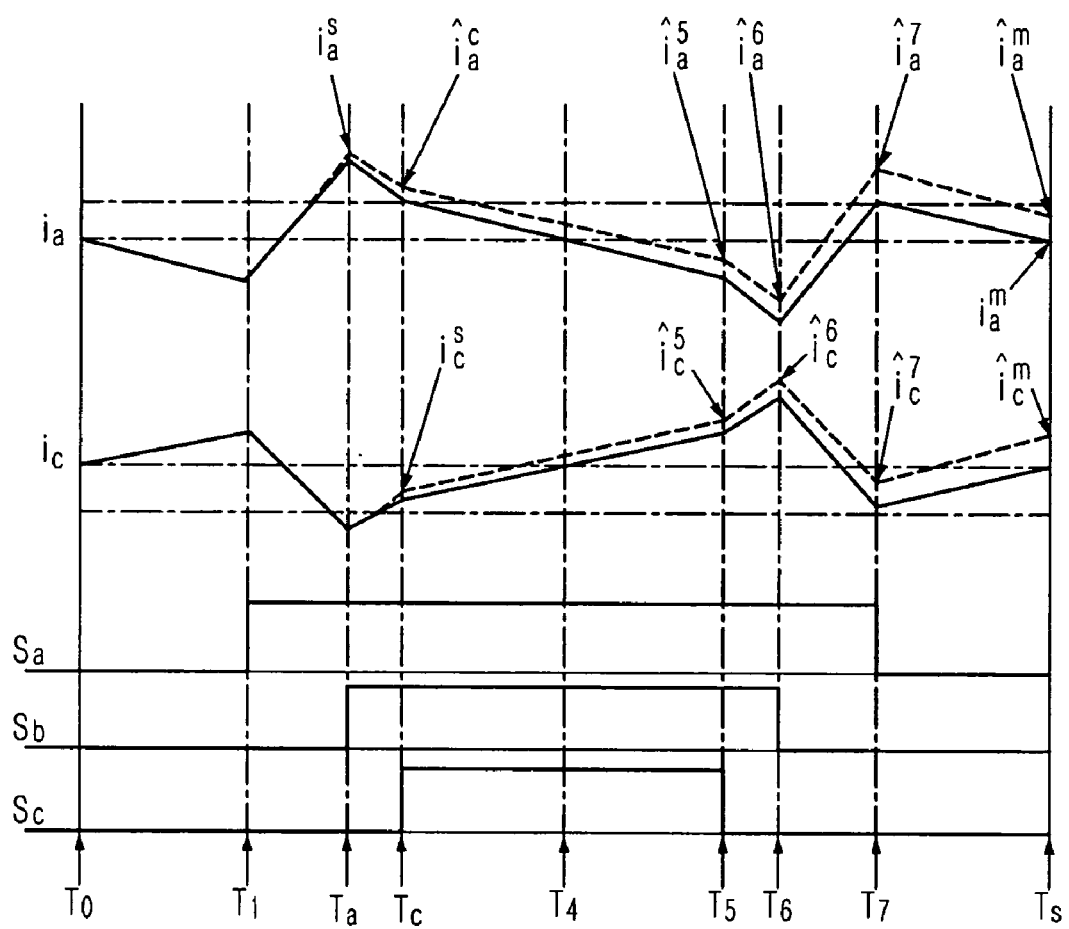
FIG. 9 is a waveform diagram illustrating prediction of three phase currents according to another embodiment of the present invention.

On the other hand, the current prediction steps include seven steps as stated above. Provided that the sampling of the single current sensor 2 is carried out at the last portion of an effective voltage vector, namely, the last time point of an effective voltage vector period, Ta will be the same as T2, and Tc will be the same as T3. In this case, OPERATION 1 and OPERATION 3 may be removed as shown in FIG. 9, so that the current prediction operations may be compressed from seven steps to five steps. FIG. 9 illustrates current prediction operations resulting from removal of OPERATION 1 and OPERATION 3 from the current prediction operations of FIG. 8.

To sum up, the current prediction operations compressed to five operations are as follows.

OPERATION 1 (Ta to Tc): predict $\hat{i}_a^c$ from equation 16, $\hat{i}_a=\hat{i}_a^s$, and $v_a=1/3 \cdot V_{dc}$.

OPERATION 4 (Tc to T5): predict $\hat{i}_a^5$ and $\hat{i}_c^5$ from equation 12, $\hat{i}_c=i_c^s$, $v_d=0$, and $v_q=0$.

OPERATION 5 (T5 to T6): predict $\hat{i}_a^6$ and $\hat{i}_c^6$ from equation 12, $v_d=1/3 \cdot V_{dc}$, and $v_q=1/\sqrt{3} \cdot V_{dc}$.

OPERATION 6 (T6 to T7): predict $\hat{i}_a^7$ and $\hat{i}_c^7$ from equation 12, $v_d=2/3 \cdot V_{dc}$, and $v_q=0$.

OPERATION 7 (T7 to Tm): predict $\hat{i}_b^m=-(\hat{i}_a^m+\hat{i}_c^m)$, $\hat{i}_a^m$ and $\hat{i}_c^m$ from equation 12, $v_d=0$, and $v_q=0$.

Figure 10:
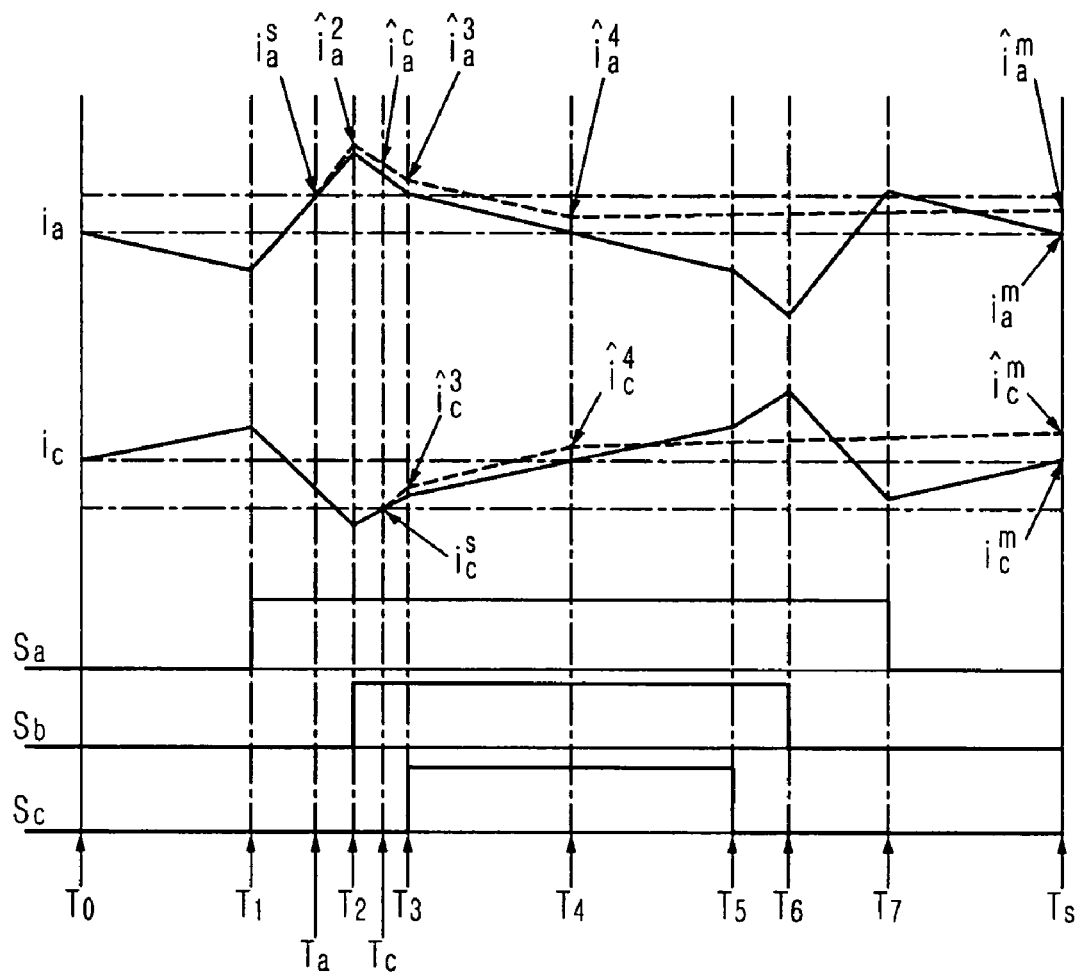
FIG. 10 is a waveform diagram illustrating prediction of three phase currents according to another embodiment of the present invention.

Also, if the concept of an average effective voltage vector is applied to the second half of the PWM period in FIG. 8, the operations after T4 may be compressed to one operation as shown in FIG. 10, thereby enabling the current prediction operations to be compressed to five operations. FIG. 10 illustrates current prediction operations resulting from compression of STEP 4 and STEP 7 of FIG. 8 to one operation.

To sum up, the current prediction operations compressed to five operations are as follows.

OPERATION 1 (Ta to T2): predict $\hat{i}_a^2$ from equation 16, $\hat{i}_a=i_a^s$, and $v_a=2/3 \cdot V_{dc}$.

OPERATION 2 (T2 to Tc): predict $\hat{i}_a^c$ from equation 16 and $v_a=1/3 \cdot V_{dc}$.

OPERATION 3 (Tc to T3): predict $\hat{i}_a^3$ and $\hat{i}_c^3$ from equation 12, $\hat{i}_c=i_c^s$, $v_d=1/3 \cdot V_{dc}$, and $v_q=1/\sqrt{3} \cdot V_{dc}$.

OPERATION 4 (T3 to T4): predict $\hat{i}_a^4$ and $\hat{i}_c^4$ from equation 12, $v_d=0$, and $v_q=0$.

OPERATION 5 (T4 to Tm): predict $\hat{i}_a^m$ and $\hat{i}_c^m$ from equation 8 or equation 12, $v^s=v_c^s$, and $\hat{i}_b^m=-(\hat{i}_a^m+\hat{i}_c^m)$.

Here, the step-unit current prediction is performed in the Ta to T4 period, and the average effective voltage vector-based current prediction is performed in the second half of the PWM period.

Figure 11:
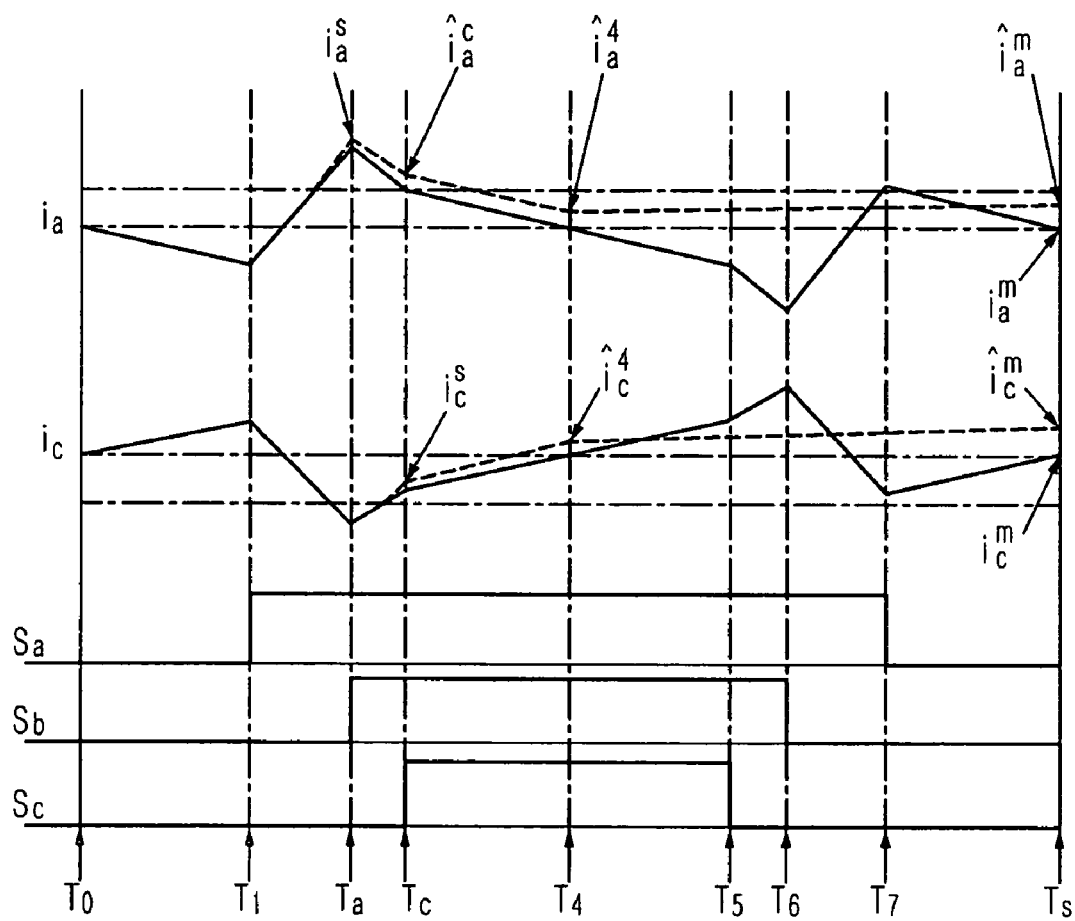
FIG. 11 is a waveform diagram illustrating prediction of three phase currents according to another embodiment of the present invention.

Also, even in this case, provided that the sampling of the single current sensor 2 is carried out at the last time point of an effective voltage vector period, Ta will be the same as T2, and Tc will be the same as T3. In this case, OPERATION 1 and OPERATION 3 in the step-unit current prediction may be omitted as shown in FIG. 11, so that the entire current prediction may include three steps.

To sum up, the current prediction operations compressed to three operations are as follows.

OPERATION 1 (Ta to Tc): predict $\hat{i}_a^c$ from equation 16, $\hat{i}_a=i_a^s$, and $v_a=1/3 \cdot V_{dc}$.

OPERATION 3 (Tc to T4): predict $\hat{i}_a^4$ and $\hat{i}_c^4$ from equation 12, $\hat{i}_c=i_c^s$, $v_d=0$, and $v_q=0$.

OPERATION 5 (T4 to Tm): predict $\hat{i}_a^m$ and $\hat{i}_c^m$ from equation 8 or equation 12, $v^s=v_c^s$, and $\hat{i}_b^m=-(\hat{i}_a^m+\hat{i}_c^m)$.

On the other hand, the current prediction may not be performed in the first half of the PWM period and may be performed in the second half of the PWM period. For voltage injection in the second half of the PWM period, the DC link current measurement is made in the second half of the PWM period, so that the current prediction operations may be compressed.

Figure 12:
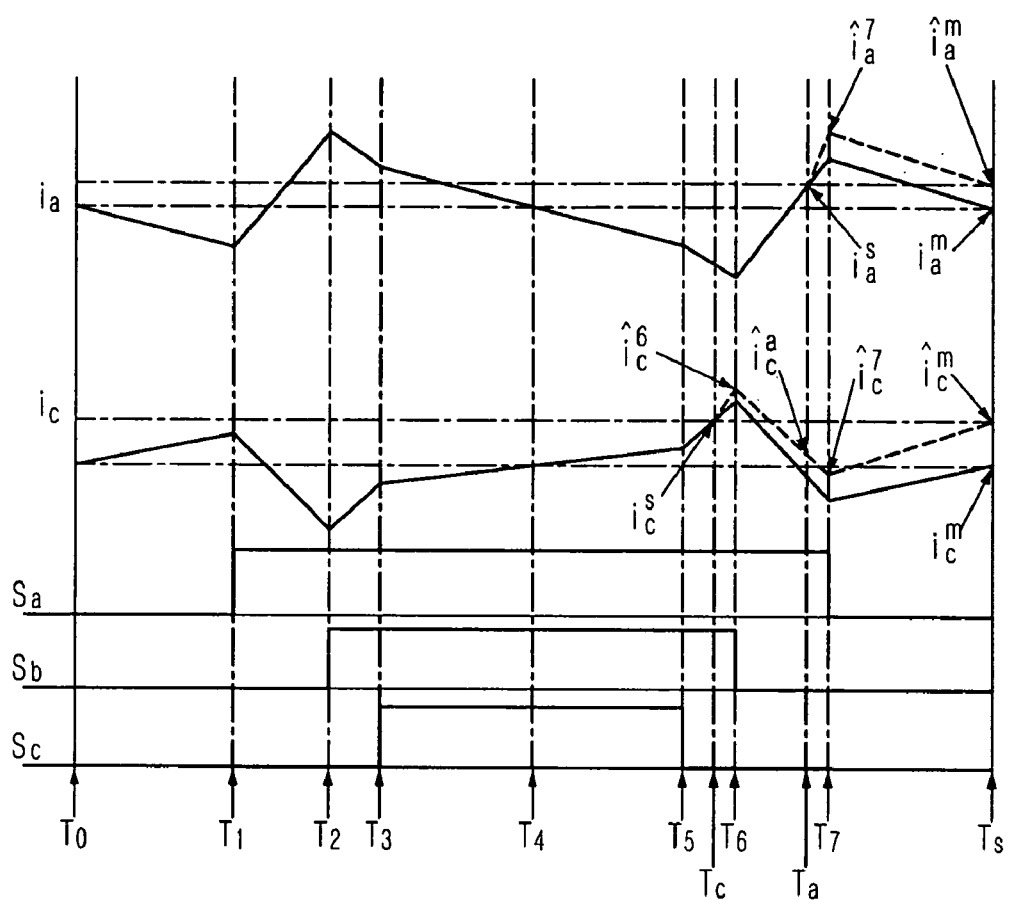
FIG. 12 is a waveform diagram illustrating prediction of three phase currents according to another embodiment of the present invention.

In this case, the DC link current sampling is carried out as shown in FIG. 12, and the current prediction operations are as follows.

OPERATION 1 (Tc to T6): predict $\hat{i}_c^6$ from equation 18, $\hat{i}_c=\hat{i}_c^s$, and $v_c=-2/3 \cdot V_{dc}$.

OPERATION 2 (T6 to Ta): predict $\hat{i}_c^a$ from equation 18 and $v_c=-1/3 \cdot V_{dc}$.

OPERATION 3 (Ta to T7): predict $\hat{i}_a^7$ and $\hat{i}_c^7$ from equation 12, $\hat{i}_a=i_a^s$, $v_d=2/3 \cdot V_{dc}$, and $v_q=0$.

OPERATION 4 (T7 to Tm): predict $\hat{i}_a^m$ and $\hat{i}_c^m$ from equation 8 or equation 12, $v_d=0$, $v_q=0$, and $\hat{i}_b^m=-(\hat{i}_a^m+\hat{i}_c^m)$.

Figure 13:
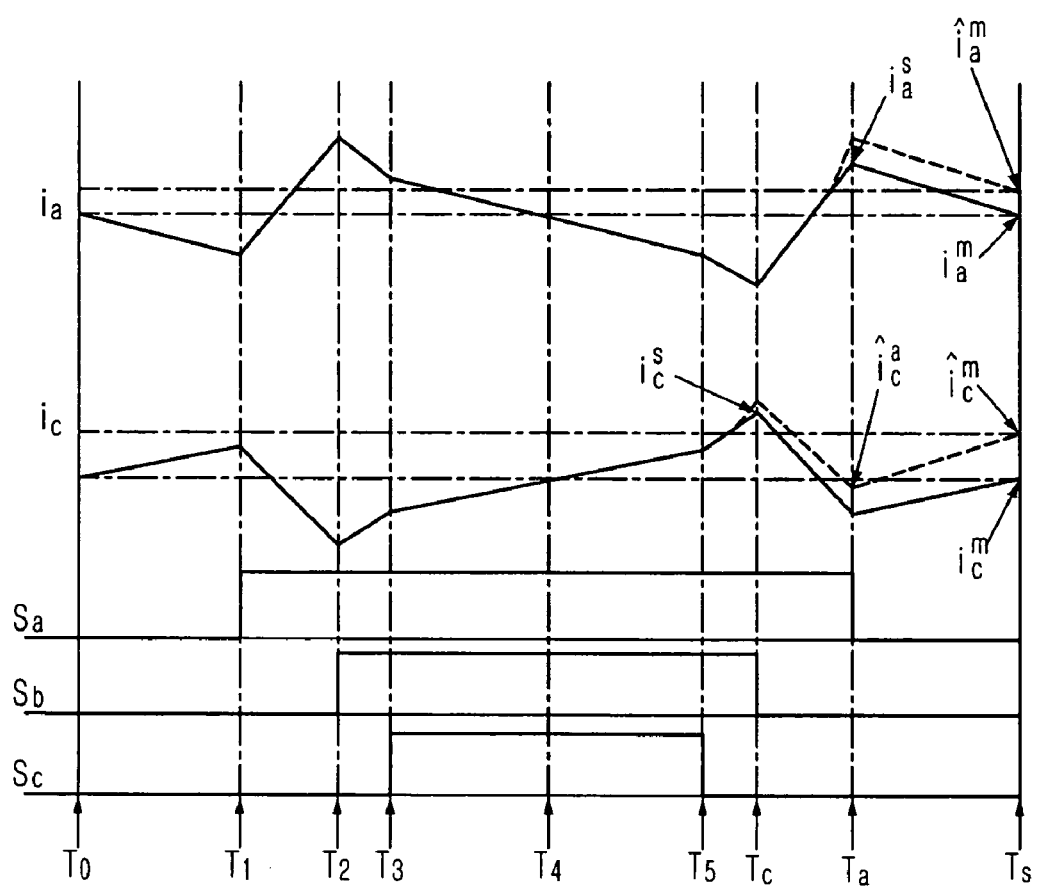
FIG. 13 is a waveform diagram illustrating prediction of three phase currents according to a further embodiment of the present invention.

Also, even in this case, provided that the sampling of the single current sensor 2 is carried out at the last time point of an effective voltage vector period, Tc will be the same as T6, and Ta will be the same as T7. In this case, OPERATION 1 and OPERATION 3 may be omitted in the above four current prediction operations as shown in FIG. 13, so that the current prediction may include of two steps.

To sum up, the current prediction operations compressed to two operations are as follows.

OPERATION 1 (Tc to Ta): predict $\hat{i}_c^a$ from equation 18, $\hat{i}_c = i_c^s$, and $v_c = -1/3 \cdot V_{dc}$.

OPERATION 3 (Ta to Tm): predict $\hat{i}_a^m$ and $\hat{i}_c^m$ from equation 8 or equation 12, $\hat{i}_a = i_a^s$, $v_d = 0$, $v_q = 0$, and $\hat{i}_b^m = -(\hat{i}_a^m + \hat{i}_c^m)$.

As is apparent from the above description, according to an embodiment of the present invention, a phase current prediction method predicts current representative of a PWM period using a motor model which receives current measured through a single current sensor as an input, instead of the measured current, and determines the predicted current to be phase current, thereby reducing a current error and, thus, a current ripple. Furthermore, it may be possible to not only reduce motor noise, but also improve control capability.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A phase current prediction method comprising:
   sequentially applying an effective voltage vector to an inverter;
   measuring DC link current in a period in which the effective voltage vector is applied; and
   predicting three phase currents representative of a PWM period of the inverter using the measured DC link current,
   wherein predicting the three phase currents comprises predicting the three phase currents during a first half of the PWM period using the measured DC link current, and predicting the three phase currents during a second half of the PWM period by applying an average effective voltage vector to the predicted three phase currents.

2. The phase current prediction method according to claim 1, wherein the measuring comprising measuring the DC link current at a last time point of the effective voltage vector period.

3. The phase current prediction method according to claim 1, further comprising measuring the DC link current during the first half of the PWM period, comprising measuring the DC link current at a last time point of the effective voltage vector period.

4. The phase current prediction method according to claim 1, wherein the measuring comprises measuring the DC link current in a second half of the PWM period.

5. The phase current prediction method according to claim 4, further comprising measuring the DC link current during the second half of the PWM period, comprising measuring the DC link current at a last time point of the effective voltage vector period.

6. The phase current prediction method according to claim 1, further comprising:
   predicting phase current when the measured DC link current is measured during a first effective voltage vector period, using the measured DC link current; and
   predicting the three phase currents when the measured DC link current is measured during a second effective voltage vector period, using the measured DC link current and the predicted phase current.

7. The phase current prediction method according to claim 6, further comprising predicting the phase current when the measured DC link current is measured during the first effective voltage vector period, comprising applying the measured DC link current to an equation corresponding to the first effective voltage vector period, from among the following equations 1 to 3:

$$\hat{i}_a = \left(-\frac{R_s}{L_s} - L_a\right)\hat{i}_a + L_a i_a + \frac{1}{L_s}v_a + \frac{\omega_r L_e}{L_s}\sin\theta_r \quad [\text{Equation 1}]$$

$$\hat{i}_b = \left(-\frac{R_s}{L_s} - L_b\right)\hat{i}_b + L_b i_b + \frac{1}{L_s}v_b + \frac{\omega_r L_e}{L_s}\sin\left(\theta_r + \frac{2\pi}{3}\right) \quad [\text{Equation 2}]$$

$$\hat{i}_c = \left(-\frac{R_s}{L_s} - L_c\right)\hat{i}_c + L_c i_c + \frac{1}{L_s}v_c + \frac{\omega_r L_e}{L_s}\sin\left(\theta_r - \frac{2\pi}{3}\right) \quad [\text{Equation 3}]$$

where $L_a$, $L_b$ and $L_c$ are constants, $R_s$ is a stator winding resistance, $L_s$ is a stator inductance, $v_a$, $v_b$ and $v_c$ are phase voltages, $\omega_r$ is an angular velocity, $L_e$ is self inductance, and $\theta_r$ is a rotation angle.

8. The phase current prediction method according to claim 6, further comprising predicting the three phase currents when the measured DC link current is measured in the second effective voltage vector period, comprising converting the measured DC link current and the predicted phase current into d-axis current and q-axis current on a coordinate system at rest, respectively, and applying the converted d-axis current and q-axis current to the following equation 4:

$$\hat{i}^s = (A_s - L_s)\hat{i}^s + L_s i^s + B_0 v^s + B_1 \quad [\text{Equation 4}]$$

where $$i^s = \begin{bmatrix} i_d^s \\ i_q^s \end{bmatrix}, A_s = -\frac{R_s}{L_s}I, B_0 = \frac{1}{L_s}I,$$

$$B_1 = \frac{\omega_r K_e}{L_s}\begin{bmatrix} \sin\theta_r \\ -\cos\theta_r \end{bmatrix}, v^s = \begin{bmatrix} v_d^s \\ v_q^s \end{bmatrix},$$

$L_s$ is a gain matrix and $R_s$ is a stator winding resistance, $L_s$ is a stator inductance, $B_o$ is a self inductance, $B_1$ is a state variable, $\omega_r$ is an angular velocity, $K_e$ is a motor counter electromotive force constant, $\theta_r$ is a rotation angle, $v^s$ is a voltage vector and $v_d^s$ and $v_q^s$ are voltages.

9. The phase current prediction method according to claim 8, further comprising predicting the three phase currents comprising repeating re-application of the three phase currents predicted using equation 4 to equation 4 for the PWM period.

10. A phase current prediction method comprising:
    sequentially applying a first effective voltage vector and a second effective voltage vector to an inverter;
    measuring first DC link current during a period in which the first effective voltage vector is applied;
    measuring second DC link current during a period in which the second effective voltage vector is applied;
    predicting phase current using the first DC link current before the measuring the second DC link current, and predicting three phase currents using the measured second DC link current and the predicted phase current after the measuring the second DC link current; and
    predicting the three phase currents for a PWM period using the predicted three phase currents,
    wherein predicting the three phase currents comprises predicting the three phase currents during a first half of the PWM period using the measured second DC link current, and predicting the three phase currents during a second half of the PWM period by applying an average effective voltage vector to the predicted three phase currents.

11. The phase current prediction method according to claim 10, further comprising predicting before the second DC link current is measured, the phase current, comprising applying the measured first DC link current to an equation corresponding to the first effective voltage vector period, from among the following equations 1 to 3:

$$\hat{i}_a = \left(-\frac{R_s}{L_s} - L_a\right)\hat{i}_a + L_a i_a + \frac{1}{L_s}v_a + \frac{\omega_r L_e}{L_s}\sin\theta_r \quad \text{[Equation 1]}$$

$$\hat{i}_b = \left(-\frac{R_s}{L_s} - L_b\right)\hat{i}_b + L_b i_b + \frac{1}{L_s}v_b + \frac{\omega_r L_e}{L_s}\sin\left(\theta_r + \frac{2\pi}{3}\right) \quad \text{[Equation 2]}$$

$$\hat{i}_c = \left(-\frac{R_s}{L_s} - L_c\right)\hat{i}_c + L_c i_c + \frac{1}{L_s}v_c + \frac{\omega_r L_e}{L_s}\sin\left(\theta_r - \frac{2\pi}{3}\right) \quad \text{[Equation 3]}$$

where $L_a$, $L_b$ and $L_c$ are constants, $R_s$ is a stator winding resistance, $L_s$ is a stator inductance, $v_a$, $v_b$ and $v_c$ are phase voltages, $\omega_r$ is an angular velocity, $L_e$ is a self inductance, and $\theta_r$ is a rotation angle.

12. The phase current prediction method according to claim 11, further comprising predicting the three phase currents after the second DC link current is measured, comprising converting the measured second DC link current and the predicted phase current into d-axis current and q-axis current on a coordinate system at rest, respectively, and applying the converted d-axis current and q-axis current to equation 4:

$$\hat{i}^s = (A_s - L_s)\hat{i}^s + L_s i^s + B_0 v^s + B_1 \quad \text{[Equation 4]}$$

where $$i^s = \begin{bmatrix} i_d^s \\ i_q^s \end{bmatrix}, A_s = -\frac{R_s}{L_s}I, B_0 = \frac{1}{L_s}I,$$

$$B_1 = \frac{\omega_r K_e}{L_s}\begin{bmatrix} \sin\theta_r \\ -\cos\theta_r \end{bmatrix}, v^s = \begin{bmatrix} v_d^s \\ v_q^s \end{bmatrix},$$

and $L_s$ is a gain matrix and $R_s$ is a stator winding resistance, $L_s$ is a stator inductance, $B_o$ is a state variable, $B_1$ is a state variable, $W_r$ is an angular velocity, $K_e$ is a motor counter electromotive force constant, $\theta_r$ is a rotation angle, $v^s$ is a voltage vector and $v_d^s$ and $v_q^s$ are voltages.

13. The phase current prediction method according to claim 10, further comprising measuring each of the first and second DC link currents at a last time point of a corresponding one of the first and second effective voltage vector periods or in a second half of the PWM period.

\* \* \* \* \*

UNITED STATES PATENT AND TRADEMARK OFFICE
CERTIFICATE OF CORRECTION

PATENT NO. : 8,362,759 B2
APPLICATION NO. : 12/588095
DATED : January 29, 2013
INVENTOR(S) : Jung Ik Ha et al.

Page 1 of 1

It is certified that error appears in the above-identified patent and that said Letters Patent is hereby corrected as shown below:

On the Title Page, Col. 1 (Inventors); Line 2, Delete "Suweon-si" and insert -- Suwon-si --, therefor.

In the Claims:

Column 12, Line 39, In Claim 8, delete "$B_o$" and insert -- $B_0$ --, therefor.
Column 14, Line 15, In Claim 12, delete "$B_o$" and insert -- $B_0$ --, therefor.

Signed and Sealed this
Twenty-eighth Day of May, 2013

Teresa Stanek Rea
*Acting Director of the United States Patent and Trademark Office*